United States Patent
Garcia et al.

(10) Patent No.: US 7,474,423 B2
(45) Date of Patent: Jan. 6, 2009

(54) REMOTE NETWORK PRINTING

(75) Inventors: Eduardo Garcia, Sant Esteve Sesrovires Catalonia (ES); Josep M Asensio, Barcelona (ES); Juan Aranda, Barcelona (ES); Josep Maria Aymerich, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 1076 days.

(21) Appl. No.: 10/281,086

(22) Filed: Oct. 24, 2002

(65) Prior Publication Data

US 2003/0112464 A1 Jun. 19, 2003

(30) Foreign Application Priority Data

Oct. 25, 2001 (EP) ................................ 01650129

(51) Int. Cl.
*G06F 15/00* (2006.01)
*G06F 15/16* (2006.01)
(52) U.S. Cl. .................................. 358/1.15; 709/204
(58) Field of Classification Search ................ 358/1.15, 358/1.14, 1.13, 1.18, 498; 709/204, 206, 709/217, 219, 224, 227–228, 237; 399/44, 399/92, 94
See application file for complete search history.

(56) References Cited

U.S. PATENT DOCUMENTS

| | | | | | |
|---|---|---|---|---|---|
| 5,559,933 | A | * | 9/1996 | Boswell | 358/1.15 |
| 5,699,495 | A | * | 12/1997 | Snipp | 358/1.15 |
| 7,058,586 | B1 | * | 6/2006 | Law | 705/5 |
| 2002/0042838 | A1 | * | 4/2002 | Tabayoyon et al. | 709/237 |
| 2003/0137688 | A1 | * | 7/2003 | Lawrence et al. | 358/1.15 |
| 2005/0264832 | A1 | * | 12/2005 | Baum et al. | 358/1.2 |

FOREIGN PATENT DOCUMENTS

| EP | 0 886 206 A2 | 12/1998 |
|---|---|---|
| EP | 1 026 578 A2 | 8/2000 |

* cited by examiner

*Primary Examiner*—Saeid Ebrahimi Dehkordy

(57) ABSTRACT

A remote printing system comprises a job sending component arranged to transmit a print job comprising one or more print files and an indicator of one or more job receivers to a remote printing server. The remote printing server is arranged to receive print jobs from one or more job sending components and to store the print jobs. The server is further arranged to receive notification of acceptance of at least a portion of a print job from one or more of the job receivers. A job receiving component is associated with a job receiver. The job receiving component is arranged to receive any of the portions of print jobs accepted by the associated job receiver and to transmit the accepted portions to a printer for printing.

23 Claims, 4 Drawing Sheets

REMOTE NETWORK PRINTING

The present invention relates to a method and system for remote network printing.

In the (Architectural Engineering and Construction) AEC market, it is common to produce very large plots using for example one of the HP DesignJet series of printers from Hewlett Packard company. Reprohouses are used to copy or to generate print jobs created by, for example, architects, with the printed copies being delivered by a courier to the different contractors and sub-contractors working with the architect.

It is well known for job receivers who may control printing resources, such as Reprohouses, to facilitate printing by remote job senders, such as Architects, via e-mail. Because a job sender cannot assume that a job receiver will have all the sender's application software, as in some cases this may be quite expensive, the job sender must provide a job to be printed in a format usable by the job receiver rather than simply transmitting application specific files. The format used is typically a printer file that the receiver can send directly to a printer or to be rendered by a printer driver. Thus, using both the original application and an e-mail client such as Outlook Express from Microsoft Corporation, the job sender has to properly generate one or more such printer files and to attach them to an e-mail message. The job receiver on receiving the e-mail message has to save the attachment(s) and send them manually to a desired printer. This solution also relies on the job sender being able to generate the printer file. The software to do this often only comes with a printer and again, because of the costs of the software or because the sender may not have the proper printer driver software installed, the sender may be unable to generate a print file. Furthermore printing accuracy problems, for example, because of differences between the printer model or driver software of the sender and the receiver, are very likely to happen using such a solution.

There are conventional systems available which to some extent address the problems of the above practices. HP Instant Delivery Service (www.instant-delivery.com) is a service from Hewlett Packard Company provided to enable a Job Receiver to download and print jobs stored as web contents on several web sites. However, this does not allow peer-to-peer delivery of content.

Other services, such as UPS OnLine Courier Service (www.exchange.ups.com), PostX (www.postx.com), Pitney Bowes (www.pb.com) or PostECS (www.usps.com/postecs) from the United States Postal Service are oriented to the reliable and secure transfer of documents using the Internet network. They are not concerned with providing printing services.

The plot.com service from E-quorum (www.plot.com) and a similar service provided by Mimeo (www.mimeo.com) allow a user to send prints using the Internet. The prints are stored at a server and one or more registered Reprohouses are given the opportunity to provide a quote for printing the job. Quotes are relayed to the sender and, if the sender accepts a quote, the Reprohouse prints the print job. A courier delivers the prints from the Reprohouse to the final destination users. Both of these services are designed to allow Reprohouses to add value to their services and to streamline the quote service. They do not allow, for example, an architect to take advantage of the fact that some contractors who are to receive a plot may in fact have printers capable of printing the plot. It will therefore be seen that these services do not allow a user to identify in a deterministic manner a party who is to print a print job and so do not allow peer-to-peer printing of a print job.

According to the present invention there is provided a remote printing system comprising: a job sending component arranged to transmit a print job comprising one or more print files and an indicator of one or more job receivers to a remote printing server; a remote printing server arranged to receive print jobs from one or more job sending components and to store said print jobs, and said server being arranged to receive notification of acceptance of at least a portion of a print job from one or more of said one or more job receivers; and a job receiving component associated with a job receiver, said job receiving component being arranged to receive any of said at least portions of print jobs accepted by said associated job receiver and to transmit said accepted portions to a printer for printing.

The present invention provides an end-to-end solution from the Job sender to the Job Receiver enhancing the collaboration workflow between the different parties in the print process.

It will be seen that unlike the HP Instant Delivery Service, the present invention uses a central server to route print jobs in a peer-to-peer fashion between sender and receivers.

The embodiment provides an Internet-enabled printing system to receive jobs sent by a remote Job Sender user.

In preferred embodiments of the invention, a sender or receiver can turn on or off the delivery of prints and adjust the scheduling of the deliveries. Also, the sender or receiver can order a job to print immediately without waiting for scheduled milestones. Preferably, both the sender and receiver can preview the prints before printing.

Furthermore, in the preferred embodiment the remote printing server advises by e-mail about the reception of a new print job.

The receiver user can accept the print dynamically on reception of the e-mail notification. Also, the Job Receiver can dynamically accept the jobs to be printed once they have identified the contents and the sender. Using the HP Instant Delivery Service, the receiver cannot accept or reject dynamically the jobs to be printed.

The present invention is particularly useful in the AEC market for allowing to architects, engineers and contractors to exchange prints, in particular for large scale printers such as HP DesignJets, in a peer-to-peer fashion rather than the server-client fashion of HP Instant Delivery Service. In fact, the invention when employed in this market enables contractors to operate for example, HP DesignJet printers as large-scale fax machines gaining the quality of the printer with the speed of communication of a fax machine. They also gain the particular advantage of being able to select whether or not to receive a print based not alone on being able to identify the job sender but also by being able to preview job contents before the job is printed.

While the present invention can incorporate the same secure and reliable transfer capabilities as the UPS type services, it adds the controlled printing capability needed to solve the problems of the prior art printing systems.

The preferred embodiments provide an integrated, reliable, easy to use and support and controlled remote printing system.

It will also be seen that a secondary benefit of the invention is the provision of a fast, cheap solution to enable users to employ more sophisticated remote printing facilities than they may have available locally.

Various embodiments of the invention will now be described with reference to the accompanying drawings, in which.

Figure 1:
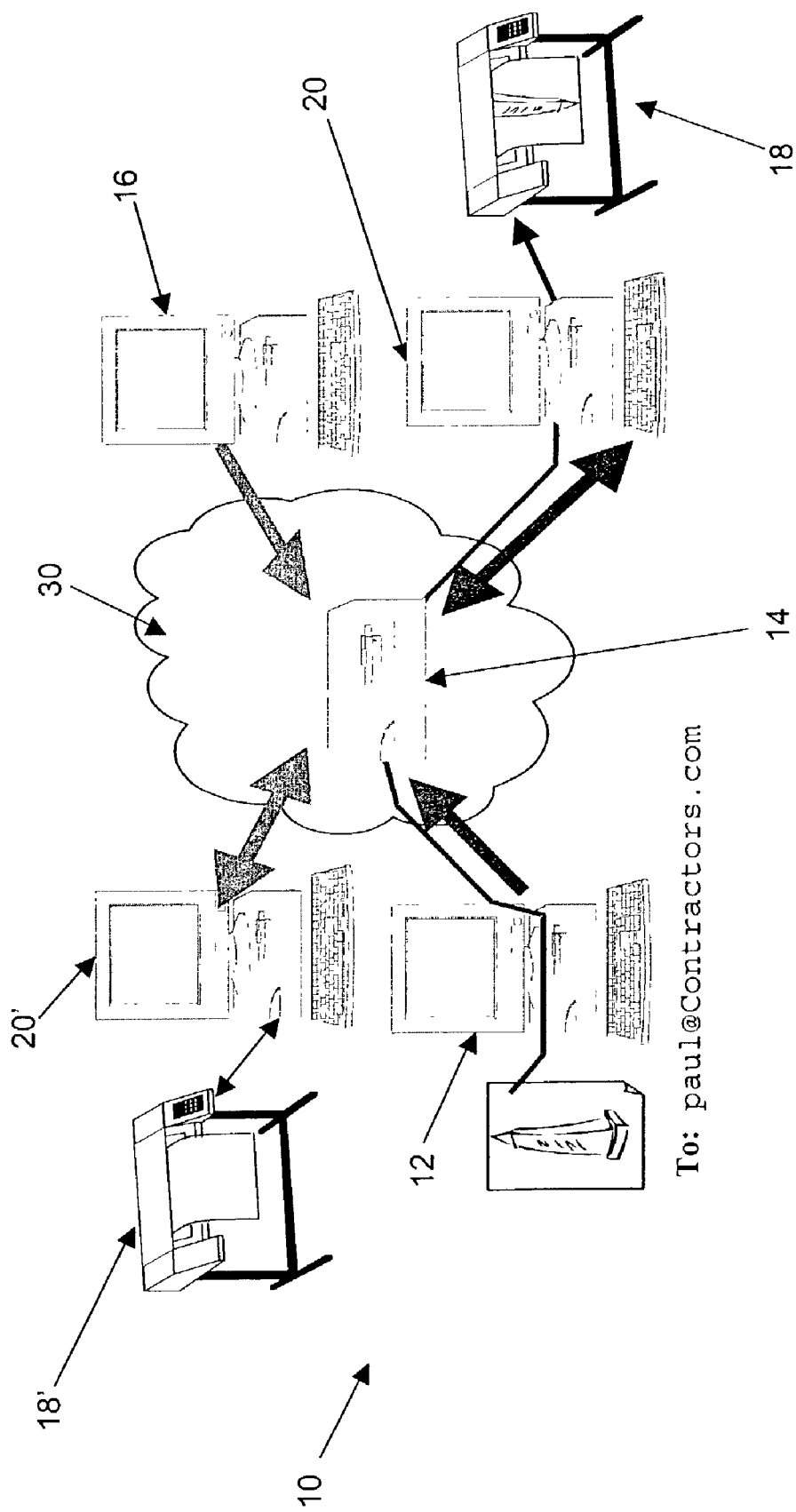
FIG. 1 is a schematic diagram of a remote printing system according to a preferred embodiment of the invention.

Referring now to FIG. 1, a preferred embodiment of remote printing system 10 according to the present invention is shown. Customers in this system may play two different roles: Users that deliver plots to be printed remotely are called Job Senders. Users that share their printers through a mailbox, so that other users can print to them are called Job Receivers. The same user can play the role of Job Sender or Job Receiver at different times, depending on their needs. In the preferred embodiment, the system allows job senders with an Internet connection to print to remote HP DesignJets 18, 18' also connected to Internet 30. Nonetheless, it will be seen that the invention is not so limited and could also be implemented wholly or partially using an Intranet WAN or LAN, or with any type of printer.

In any case, the system of the preferred embodiment includes three subsystems:

1. a sender subsystem installed on a job sender's computer 12 which allows registered users to send print jobs from any application. In the preferred embodiment, the job sender comprises a Microsoft Windows printer driver installed as a "Remote Printing" printer. The printer can be selected for printing from any application running on the computer 12 to generate print files for a print job. The job sender can then cause the print job to be uploaded to a remote printing server 14;
2. the remote printing server subsystem 14 handles all Internet communications and performs the receiving, processing, tracking and routing of the uploaded print jobs to job receiver(s). Furthermore, it allows a job receiver(s) 16 to accept or reject the received print jobs to be printed at a printer 18, 18' with which they are associated; and
3. a receiver subsystem installed on an network connected device such as a general purpose computer 20, 20' which, in the preferred embodiment, connects periodically to the remote printing server 14 to download jobs to be printed at a local destination printer 18, 18' connected to the network connected device. The receiver subsystem then renders the print job and sends the job to the printer 18, 18'.

Initially, job receivers willing to allow remote job senders to print to their HP DesignJets first register into this service either by downloading and installing job receiver software from an Internet web site or installing the software from a local or remote disk onto a network connected device to which the printer is connected.

Alternatively, the receiver may first simply register at the remote printing server and later download the client software from the Remote Printing server. Of course, once the client software has been downloaded, it can be put on an Intranet network server and everybody from a company with access to the server can install it. In FIG. 1, the device is shown to be a general-purpose computer 20 which may be connected via a LAN or dial-in connection to the Internet 30. Alternatively, the device may be an IP (Internet Protocol) enabled card incorporated in the printer and which is capable of having the receiver subsystem software installed in it.

During the registration process, a mailbox, identified by an e-mail address, will be created for each registered job receiver. Thus, as shown in FIG. 1, a job receiver's mail client software, for example, Internet Explorer for Microsoft Corporation, may be installed on a separate network connected device 16 from the device 20 to which its associated printer 18 is connected. Again, the device 16 can be any device capable of receiving e-mail even for example, a PDA or a mobile phone. Clearly, the mailbox can also be installed on the computer 20 to which the destination printer 18 is connected, although it will be seen from the above that this is not strictly necessary.

At the same time, users who wish to act as job senders can install job sender software in the same manner as described above on a computer 12 from which they wish to send print jobs. This also entails registering with the remote printing server where they are provided with a username and optionally a password. During registration, they can also provide one or more e-mail addresses as means for being notified of the progress of print jobs—again the mail client for this e-mail address(es) need not run on the same machine from which print jobs are generated. Alternatively, the user could additionally or alternatively specify a phone number to receive notifications as SMS messages.

The job sender software is preferably delivered in the form of a package such as a wizard or self-executing file for installing a printer driver and setting up the "Remote Printing" printer. Thus, when the printer is installed with this printer driver, it becomes available for printing from any Windows application running on the job sender computer 12.

Figure 2:
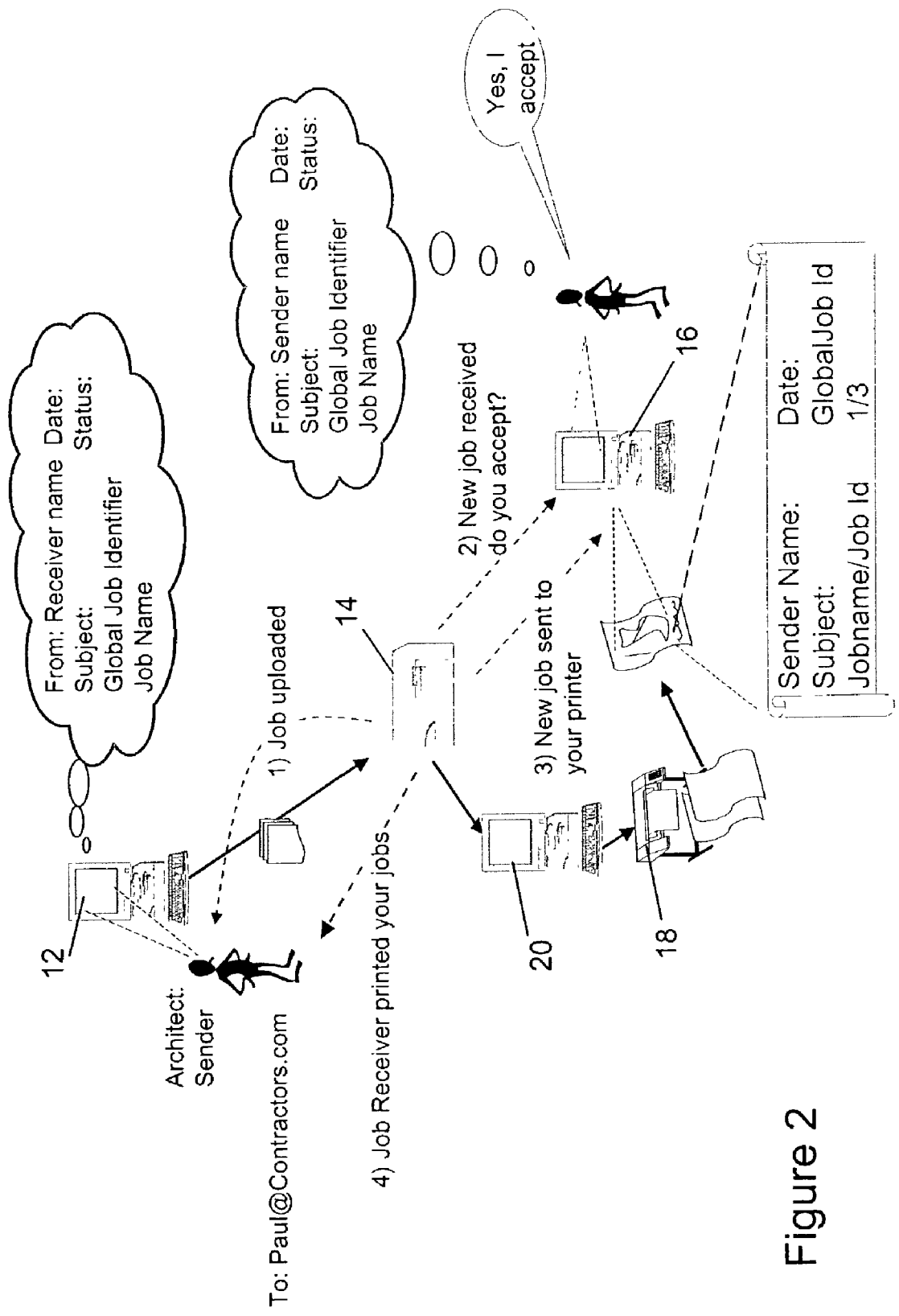
FIG. 2 is a schematic diagram illustrating the steps involved in processing a print job.

Referring now to FIG. 2, which shows at a high level the steps involved in processing a print job:

At step 1, "Job Uploaded", the Job Sender sends a job to the Remote printing server 14 using the job sender sub-system installed on the computer 12. Thus, the user running an application, for example, AutoCad from AutoDesk selects the installed "Remote Printing" printer from the print dialog box. When the user selects "OK" in the dialog box to print one or more selected pages, the application then begins making calls to a GDI function (Graphics Device Interface is the graphics display system in Microsoft Windows) and sends it the parameters for the objects that must be created. GDI in turn "draws" the objects by sending commands to the printer driver, which actually renders the images. In this case, the remote printing printer driver in turn uses functions exposed by the conventional HP DesignJet printer driver API (Application Programming Interface), a DLL (Dynamic Link Library) resident on the computer 12, to generates a temporary file on disk in HP-GL/2 format. HP-GL/2 is selected for being a reasonably compact representation of the print job, but it will be seen that the invention is not limited to this format and other formats such as Postscript or PDF (Portable Document Format) could also be used. In general (although the invention is not so limited), these formats can be described as comprising printer mark-up language or vector versions of a print job as compared to raster or bit map versions of the print job.

In any case, at the same time as the HP-GL/2 is being generated the printer driver software instantiates a port monitor thread or process which monitors the generation of the HP-GL/2 file being written to disk. When the file is complete, the port monitor instantiates a job sending process. When the job sending process begins, it looks for the temporary HP-GL/2 file and begins by generating a preview file from the HP-GL/2 file information. This is done by first rendering the HP-GL/2 file information to generate a bitmap picture corresponding to the first page of the HP-GL/2 file information. This bitmap information is then in turn converted to a more compressed JPEG format image file. The HP-GL/2 and JPEG files are then added to a basket of printer files comprising the print job.

In the preferred embodiment, the job sending process continues by displaying a dialog box, which lists the printer files currently in the basket, and preferably displays the JPEG image associated with each printer file as a thumbnail preview. The user is therefore able to select previously printed files and either adjust their attributes, for example, by increasing the number of copies to be produced (initially selected in the print dialog box) or altering print characteristics like print quality, resolution, colour (colour, grey levels or black and white), the orientation of the drawing (portrait versus landscape) and the page size; or simply to delete the printer file from the print job.

Once the printer job has been finalised, the user clicks a button in the dialog box to cause the print job to be uploaded to the remote printing server 14. This causes either a generic web browser such as Internet Explorer or a dedicated browser to launch and connect to a login web page stored on the remote printing server 14. The user then logs into the site and navigates to a page where the user inputs the details of the print job such as the destination e-mail address(es), the subject of the print job, any message to be delivered to the job receiver etc. It is during this interaction that the HP-GL/2 and JPEG files comprising the print job are uploaded using, for example, conventional HTTP (HyperText Transfer Protocol) commands such as HTTP Post.

Once the print job has been uploaded, then the job sending printer driver can either delete the printer files and thumbnails in the basket or it can mark the uploaded files in the basket as having been sent and perhaps even to whom. The user can then delete these as desired in formulating the next print job.

Alternatively, the job sending printer driver could allow the user to generate more than one print job at any given time and all such alternatives fall within the scope of the present invention. In a further alternative, the job sending printer driver can be adapted to allow the user to save printer files to disk and to later upload these to a new print job at which time a new thumbnail preview will be generated.

In the preferred embodiment, at the server side, the handling of user interaction with the web site is controlled by respective instances of servlets. Servlets are part of the Java 2 platform from Sun Microsystems and provide Java applications that run in a Web server or application server to enable server-side processing, typically to access a database or perform e-commerce processing. Servlets are a Java-based replacement for CGI scripts, Active Server Pages (ASPs) from Microsoft and proprietary plug-ins written in C and C++ for specific Web servers (ISAPI, NSAPI). As such, it will be seen that the invention is equally implementable using these and other alternative techniques.

Thus, an instance of servlet will handle an interaction session with a job sender so obtaining the print job files and details contained with the HTTP Post requests and, in the preferred embodiment, writing these to a database.

Because the job sender is a registered user and because the user has logged on to the remote printing server, the server will know the e-mail address provided by the job sender on registration. Thus, after the print job details have been stored in the remote printing server, either the instance of servlet handling the particular print job or a dedicated daemon which monitors jobs submitted for printing generates an e-mail message for the job sender. Thus, the Job Sender can receive an e-mail notification from the Remote printing server acknowledging the uploading.

In the example, of FIG. 2, the Job Sender specifies the address of one or more Job Receivers to which the job is intended, in this case Paul@Contractors.com. Thus, in step 2, "New job received. Do you accept?", after the print job details have been stored in the remote printing server, either the instance of servlet handling the particular print job or a dedicated daemon which monitors jobs submitted for printing generates an e-mail message for each destination specified by the print job sender. Thus, each Job Receiver receives an e-mail notification in their mail client.

The Job Receiver either independently or in response to the e-mail can go to the Remote printing web site to see the contents of the job to be printed and there the Job Receiver user can accept the job or reject/delete the job received.

In the preferred embodiment, the e-mail notification contains a URL identifying a Java Server Page (JSP) on the remote printing server 14. JSP, is an extension to the Java servlet technology from Sun Microsystems that provides a simple programming vehicle for displaying dynamic content on a Web page. A JSP comprises an HTML (HyperText Markup Language) page with embedded Java source code that is executed in the Web server or application server. The HTML provides the page layout that will be returned to the Web browser, and the Java provides the processing; for example, to deliver a query to the database and fill in the blank fields with the results. The JSP is compiled into bytecode (into a servlet) when first encountered by the server. Again, JSPs are the Sun/Java counterpart to Microsoft's ASPs (Active Server Pages) and as such the invention can be implemented using this and other suitable alternative techniques.

When the job receiver clicks on the e-mail notification URL, a browser (generic or dedicated) installed on the job receiver computer 16 launches and first displays a dialog or page asking the receiver to login before using the JSP to generate a page displaying either the specific print job which caused the e-mail notification to be generated or in fact all print jobs for which the receiver is responsible. The jobs to be displayed are a function of the query specified in the Java portion of the JSP and the attributes to be displayed are a function of the layout specified in the HTML portion of the JSP. Thus, in the preferred embodiment, each print job is displayed with a status icon and preview thumbnails corresponding to each print file of the print job along with any other relevant details of the print job(s).

Alternatively, the job receiver can accept the job directly from the e-mail notification. In this embodiment, the e-mail notification, as well as text type job details shown in FIG. 2, could include thumbnail previews of the print files comprising the print job, as well as a pair of URLs (or buttons corresponding to URLs) which when clicked indicate the job receiver's acceptance or rejection of the print job. In any case, it will be seen that the format of the e-mail notification and the manner in which it is rendered will of course depend on the platform on which the job receiver is running their e-mail client. Thus, the notification to say a WAP phone or in an IVR (Interactive Voice Recognition) mail client would be far more limited than on a desktop mail client. It will also be seen that in potentially dealing with multiple client platform types, use may be made of XML messages which can be rendered appropriately on client devices.

In any case, if the Job Receiver accepts the job, an appropriate status attribute in the database object for the job is updated accordingly.

In a further alternative embodiment, the Job Receiver can log onto the remote printing server or send a message to the server indicating that it wishes its associated printer to operate in non-attended mode, possibly even identifying specific job senders for whom non-attended mode is allowable. When the remote printing server receives a print job which can operate in non-attended mode, its controlling servlet can write the status attribute for the database object to indicate that the job has been accepted or it can indicate specifically that the job can operate in non-attended mode. In any case, the servlet or the mailer daemon knows that it is not necessary to send a notification and to receive job receiver acceptance before the job can be printed. (Nonetheless, a simple e-mail notification for record purposes may be sent to the job receiver.)

At the same time, each receiver sub-system running on the devices 20, 20' periodically polls the remote printing server 14 to determine if there are jobs which it is to print. These are jobs which it has not already downloaded and which have been accepted or are to be processed in non-attended mode. It will be seen that by operating the receiver in a polling mode, the remote printing server does not need to push files to the receiver and so will not encounter problems with firewalls. Neither does it need to consider whether receiver sub-systems are more generally available or not i.e. if they may be switched off. If on the other hand firewalls were not a problem where, for example, the invention were implemented in an Intranet, the invention could be implemented with the server actively transmitting print job details to receiver sub-systems.

In the preferred embodiment, a receiver sub-system downloads the print files for the job in HP-GL/2 format and renders the job. In general, where a HP DesignJet is used, the job is rendered into RTL (Raster Transfer Language) before sending it to the local printer that the Job Receiver specified as his printer destination. In the case of HP DesignJet 500/800 models, the job is rendered into PCL/3 (Printer Control Language) before being sent to the printer.

As mentioned above printer mark-up language type files can provide a relatively compact printer file, the only drawback being that some printer drivers may interpret the mark-up language format differently than others, so resulting in discrepancies between a job sender's expectations of the printed output and the actual printed output. On the other hand, raster versions of a print job are less prone to misinterpretation, but can result in infeasibly large printer files, so requiring compromises in quality such as the job sender only generating black and white files. In the case of plot.com, because no assumptions can be made about the type of printer being employed, the job sender employs raster type print files which are necessarily either very large or of limited quality.

It will be seen that in the AEC market, a party employing the job sender component and a party employing the job receiver component may both have access to the same type of printer, for example, one of the HP DesignJet series of printers. Thus, using the preferred embodiment, even though a print job comprises printer mark-up language type files, the job sender has greater certainty that the job receiver will in fact render the print job to raster format and print the job in a manner compatible with the job sender's expectations. This is a particularly important benefit in the AEC type market where last minute changes to large scale print files by a content generator, such as an architect, may need to be transmitted to numerous remote parties, such as contractors, who need to actually print the job, for example, to bring plots to a building site, and to act on these changes quickly.

To emphasise this further, the job sender component can be provided with an option to allow a user to generate a raster version of the print file or entire print job and have this printed to a local printer. Once the job sender is satisfied with this printed output, the sender will know that they should be equally satisfied with the output of the printer associated with the job receiver and the print job can then be uploaded to the remote printing server.

In any case, once the job is downloaded by the job receiver, the status attribute for the print job is updated on the remote printing server. Again, at step 3, "New job sent to your printer", either the instance of servlet responsible for downloading the print job to the printer or a mailer daemon can send an e-mail notification to the job receiver to indicate the print job has gone for printing.

Similarly, at step 4, "Job Receiver printed your jobs", the same instance of servlet or mailer daemon can send a message to the job sender to say the job is printing.

It will also be seen that at any time, a job sender running a web browser can connect to the remote printing server web site and again, having logged in, use JSPs to dynamically generate web pages from the database of stored print jobs comprising lists of the print jobs submitted by the job sender and their status. These pages can furthermore be interactive, allowing the user, for example, to change the attributes of the print job to say add or delete job receivers from the destination list, change the number of copies to be made or simply to delete the print job.

In a further refinement and in particular where the device 20 is a general-purpose computer, the job receiver sub-system can be implemented as an interactive application rather than a daemon. Thus, if for example a print job is urgent, a job receiver having accepted a print job, can order from the receiver subsystem user interface, the immediate downloading of the job. In this case, the receiver does not wait for the current polling period to elapse but rather begins polling immediately and so the downloading of the print job begins immediately.

It will be seen that the embodiment allows the receiver to decide exactly what is to be printed and when (immediately or later). Also, the receiver is advised by e-mail notification when there is a new job to accept and when the printer has printed the job.

Referring now to FIGS. 3(*a*) and 3(*b*) which illustrate the operation of the remote printing server in more detail.

The process begins when a print job is successfully uploaded to the server, step 32, and the server responds by sending a message to the job sender (JS), step 34, also indicated as step 1) in FIG. 2. The server then records a time T1 associated with the print job, step 36. If the server process determines, having being notified accordingly by the job receiver (JR) as explained above, that the print job should be processed in non-attended mode, the print job status is immediately set to accepted, step 48. Otherwise, the server sends an e-mail notification to the job receiver, step 38, also shown as step 2) in FIG. 2. The print job status is then set to sent, step 40. (In fact users will not be aware of these steps and once a job is submitted, it immediately appears to be accepted or sent when viewed on the web site.)

A number of possible state transitions may then occur. If the job receiver responds to the e-mail notification and is viewing the contents of the print job via their web browser, step 42, the job status is then set to opened, step 44. Thus, when for example another user opens the print job package via their web browser, the status icon associated with the print job will have changed from sent or accepted but closed to opened. In the opened state, the possible state transitions are the same as for the sent state (except for the transition to the open state).

If during the interaction with web pages displaying the open print job details, or directly from the e-mail notification or otherwise, the job receiver accepts the print job, step 46, then its status, at least for that particular job receiver destination changes to accepted, step 48. It will be seen that a receiver need not accept all print files within a print job and in a refinement of the embodiment, the receiver may select certain print files for printing. In this case, the remote printing server will keep track of the state of each print file within a print job, rather than the print job as a whole.

Alternatively, the job receiver may elect to delete the print job package, step 50. In this case, a message may be sent to the job sender indicating that the particular job receiver has rejected the print job, step 52. If there are no other job receivers for the print job in a sent, open or accepted state, the server continues by deleting the print job information from storage, step 54 and then continues by changing the state of the print job for the receiver to deleted, step 56.

Once the job receiver deletes the print job, it means that the regarding this print job will no longer be visible to the job receiver on the web site. Due to this, for the job receiver, the status is NA (Not applicable) and no other actions are available for the job receiver, as they cannot interact further with the print job.

Another daemon also runs on the remote printing server and monitors the times T1 for respective print jobs. If the time elapsed since T1 for any job exceeds a threshold without the job being accepted by any job receiver, step 58, then the print job information is deleted from storage, step 60. The daemon may then continue by sending messages indicating the job's expiration to both the job sender and job receivers for the job, step 62, as well as changing the state of the job to expired, step 64. The only possible state change available then is, in response to job receiver interaction, deleting the job and changing its state to deleted. Alternatively, when a print job expires, it can proceed directly to the deleted state, step 56, so preventing any further interaction by the job receiver.

Figure 3A:
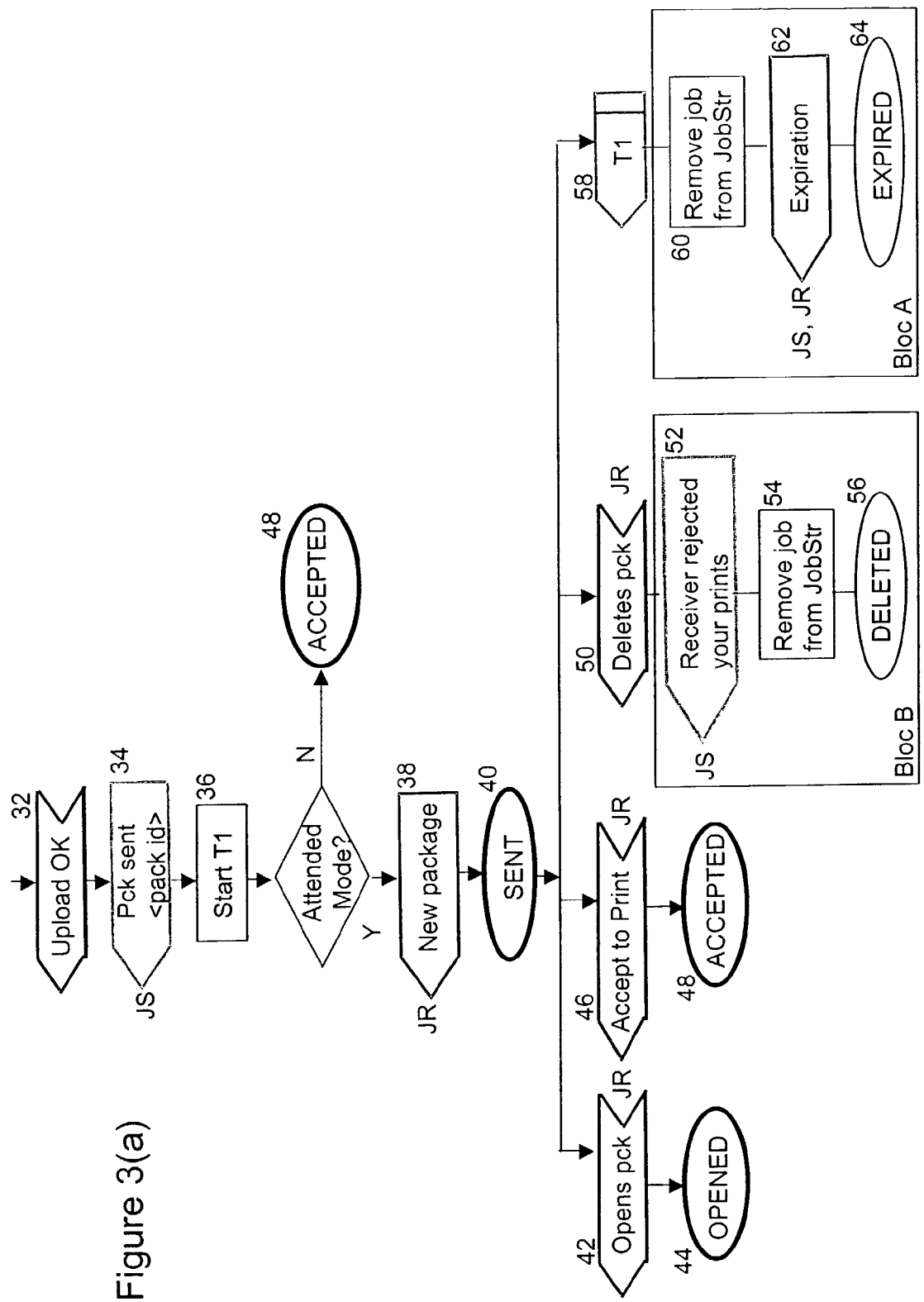
FIGS. 3(a) and 3(b) are state diagrams for a remote printing server of FIG. 1.
Figure 3B:
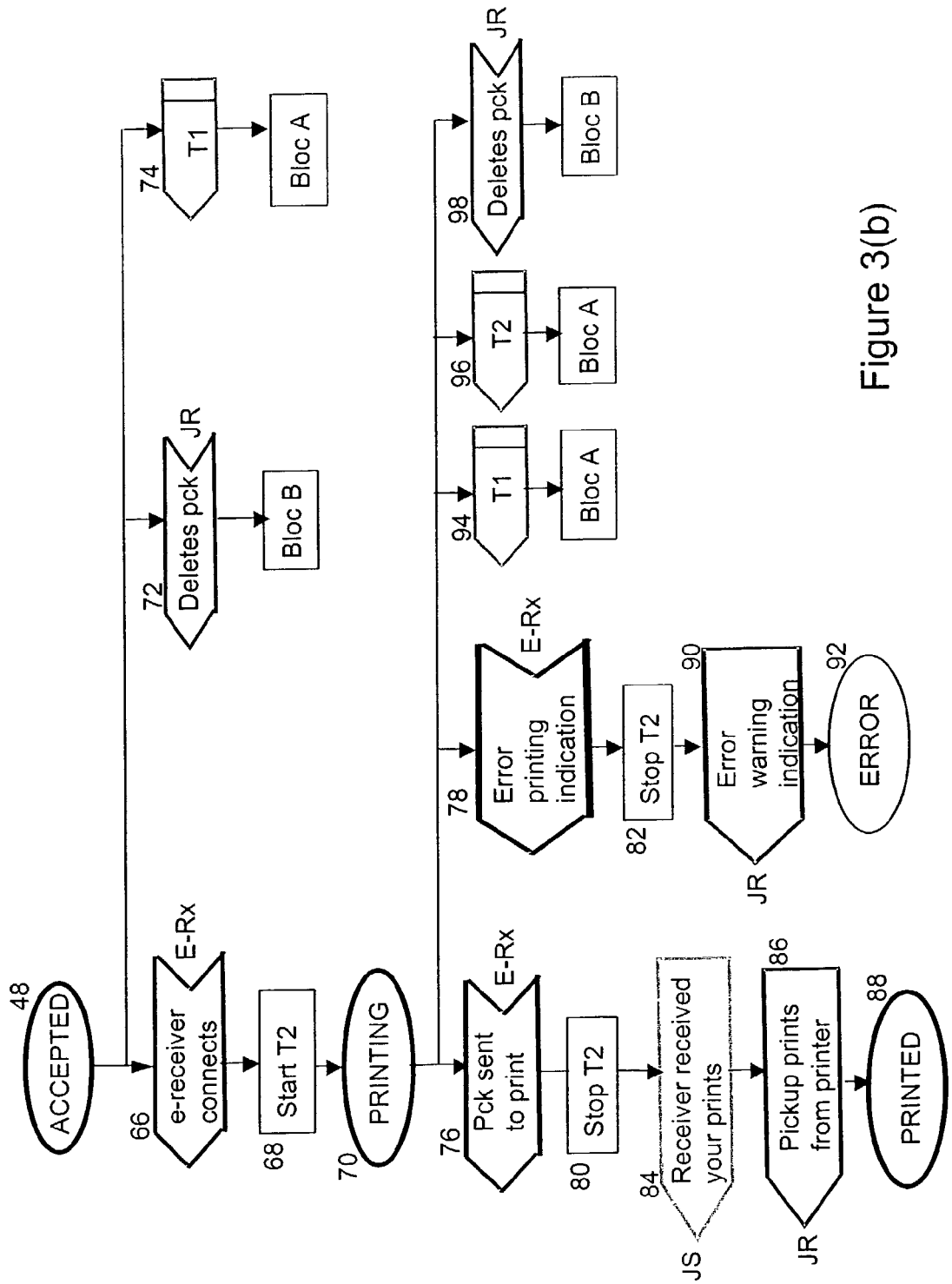

Referring now to FIG. 3(b), when in the accepted state, the receiver sub-system (E-Rx) responsible for the job may begin to download a print job, step 66. In the preferred embodiment, the server then records a second time T2 associated with the print job, step 68, and the print job enters a printing state, step 70. Thus, T2 represents the time without notice from the receiver sub-system (E-Rx), whereas T1 represents the total time the job is stored at the remote printing server.

Again, at any time before the job is downloaded, the job receiver may in fact connect to the remote printing server and delete the job, step 72, so causing the server to go through steps 52-56 described previously and indicated as Bloc B.

The timeout based on the time T1 is also still active and if the print job does not move into the printing state before the threshold time after T1, step 74, the print job will again be marked as expired by going through steps 60-64 indicated as Bloc A.

Nonetheless, after entering the printing state, the print job details will either be successfully downloaded to the receiver subsystem, step 76, or the receiver subsystem will indicate an error in downloading from the server, step 78. In either case, the timing from T2 is stopped, steps 80, 82. In the former case, the server will send a message to the job sender to say the print job has been received, step 84, also indicated as step 4) in FIG. 2. The server then continues by sending a message to the job receiver to say the print job is printing, step 86, also indicated as step 3) in FIG. 2. Finally, the server updates the state of the job to printed, step 88.

In the printed state, the possible user actions are to:

Print: which means to "accept" and so reprint the job again. The status and actions are the same as coming from the accepted state, step 48, but showing the status "Printed" for the Job sender when viewing the web site. Alternatively, the status can be updated to include the number of times a job has been printed, for example, "1 Printed", "2 Printed" etc. The notification at step 84 is also not needed;

Delete: which means the status when viewing the print job for the Job Sender will continue to be "Printed", but for the Job Receiver no action will be available;

Open if the print job package has not been opened before; or

Expiration

On the other hand, if an error is received, step 78, the server sends a message to the job receiver, step 90, and changes the print job state to error, step 92. In the error state, the job is again in an opened/accepted like state, but shows an error state icon when being viewed by a job receiver through the web site. It means that the Job Receiver has to explicitly accept the print job package again as in step 46. It is therefore presumed that the job receiver will solve the problem causing the error, for example, clipping problems, Internet connection problems, etc. if it is possible and will accept the print job package again.

It is still possible when in the printing state, step 70, if the print job does not reach the printed state, step 88, before the timer thresholds for T1 or optionally T2 are reached for the job to expire, steps 94, 96. Similarly, the job receiver can still delete the print job, step 98, causing the job to be deleted through the steps of Bloc B.

It will be seen that FIGS. 3(a) and 3(b) do not explicitly show the possibility of a job sender deleting a print job, although it will be seen that, before the job has been accepted or printed by a receiver, this can be done in a manner analogous to steps 50, 72 and 98 with appropriate changes to Bloc B.

The invention claimed is:

1. A remote printing system comprising:
a job sending component arranged to transmit a print job comprising at least one print file and an indicator of at least one job receiver to a remote printing server, the indicator comprising an e-mail address corresponding to the job receiver, the job receiver being an entity to accept the print job for printing;
the remote printing server arranged to receive a plurality of print jobs from at least one job sending component and to store the print jobs, the remote printing server being responsive to receipt of said indicator for sending an e-mail message addressed to the e-mail address corresponding to the job receiver for determining whether the job receiver will accept the print job for printing and the remote printing server being arranged to receive a notification of acceptance of a portion of the print job from the job receiver; and
a job receiving component associated with the job receiver, the job receiving component being arranged to receive the portion of the print job accepted by the associated job receiver and to transmit the accepted portion to a printer for printing, wherein the job receiving component notifies the remote printing server when the portion of the print job is printed.

2. The remote printing system of claim 1, wherein the server is responsive to the indicator to notify the job receiver of receipt of the print job.

3. The remote printing system of claim 2, wherein the printing server is arranged to notify the job receiver by sending an e-mail message to the e-mail address.

4. The remote printing system of claim 1 wherein the remote printing server is arranged to receive the notification of the job receiver's acceptance of at least one print job prior to the print job being received at the remote printing server.

5. The remote printing system of claim 1 wherein the job receiving component is arranged to connect to the remote printing server and to download each print job accepted by an associated job receiver.

6. The remote printing system of claim 1 wherein the remote printing server is responsive to the print job being accepted to notify the job sending component.

7. The remote printing system of claim 1, wherein the job sending component is arranged to generate said print files in a printer mark-up language type format, and wherein the job receiving component is arranged to render the print files in a raster format prior to sending said print files to the printer for printing.

8. The remote printing system of claim 1, wherein the job sending component is responsive to user interaction to generate a raster format version of the print file and to transmit the print file to an associated printer for printing.

9. The remote printing system of claim 1, wherein the remote printing server includes a transmitter for transmitting the portion of the print job accepted by the associated job receiver to the job receiving component associated with the job receiver.

10. A remote printing system comprising:
a job sending component arranged to transmit a print job comprising at least one print file and an indicator of at least one job receiver to a remote printing server, the indicator comprising an e-mail address corresponding to the job receiver;
the remote printing server arranged to receive a multitude of print jobs from at least one job sending component and to store the print jobs, and the server being arranged to receive a notification of acceptance of a portion of the print job from the job receiver; and
a job receiving component associated with the job receiver, the job receiving component being arranged to receive the portion of the print job accepted by the associated job receiver and to transmit the accepted portion to a printer for printing, the server further arranged to notify the job receiver by sending an e-mail message to said e-mail address, the e-mail message including a Uniform Resource Locator (URL) identifying a web page on the remote printing server which when selected causes the job receiver to connect to the web page on the remote printing server to display details of the print job, wherein the job receiving component notifies the remote printing sewer when the print job is printed.

11. The remote printing system of claim 10, wherein the web page is an interactive web page and the remote printing server is responsive to the job receiver interacting with the web page to receive the job receiver acceptance of the portion of the print job.

12. The remote printing system of claim 11, wherein the job sending component is arranged to generate a preview image for each print file and to include the preview image in the print job, and wherein the remote printing server is arranged to include the preview image in the interactive web page.

13. A remote printing system comprising:
a job sending component arranged to transmit a print job comprising at least one print file and an indicator of at least one job receiver to a remote printing sewer, the indicator comprising an e-mail address corresponding to the job receiver;
the remote printing server arranged to receive a multitude of print jobs from the job sending component and to store the print jobs, and the sewer being arranged to receive a notification of acceptance of a portion of the print job from the job receiver; and
a job receiving component associated with the job receiver, the job receiving component being arranged to receive the portion of the print job accepted by the associated job receiver and to transmit the accepted portion to a printer for printing, the server further arranged to notify the job receiver by sending an e-mail message to the e-mail address, the e-mail message including a first URL which when selected causes a notification of the receiver's acceptance of the print job to be transmitted to the remote printing server and a second URL which when selected causes a notification of the receiver's refusal of the print job to be transmitted to the remote print server, wherein the job receiving component notifies the remote printing server when the print job is printed.

14. The remote printing system of claim 13 wherein the job sending component is arranged to generate a preview image for each print file and to include said preview image in the print job, and wherein the remote printing server is arranged to include the preview image in the e-mail message.

15. The remote printing system of claim 14 wherein the job receiving component is arranged to run as a non-interactive process and to periodically connect to the remote printing server to download the accepted print job.

16. The remote printing system of claim 14 wherein the job receiving component is arranged to run as an interactive application and wherein the application is responsive to user interaction to connect to the remote print server and to download the accepted print job.

17. The remote printing system of claim 14 wherein the remote printing server is responsive to the print job being downloaded to notify a job sender.

18. A method of operating a remote printing system comprising:
transmitting from a job sending component, a print job comprising at least one print file and an indicator of at least one job receiver to a remote printing server, the indicator comprising an e-mail address corresponding to the job receiver;
receiving at a remote printing server, a plurality of print jobs from at least one job sending component;
storing the print job;
sending an e-mail message to the e-mail address in the indicator, the e-mail message inquiring whether the job receiver identified by the e-mail message is prepared to accept a portion of the print job;
receiving at the server, a notification of acceptance of the portion of the print job from the job receiver;
receiving at the job receiving component associated with the job receiver, said portion of the print job accepted by the associated job receiver;
transmitting the accepted portion of the print job to a printer for printing, and
notifying the remote printing server when the print job is printed.

19. The method of claim 18, wherein transmitting from the job sending component and receiving at the job receiving component are performed by a same party for different print jobs.

20. A computer program comprising computer program code stored on a computer readable storage medium for, when executed on a computer, operating a remote printing server, the program comprising:
computer program means for receiving a plurality of print jobs comprising at least one print file and an indicator of at least one job receiver from at least one job sending component, the indicator comprising an e-mail address corresponding to a job receiver;
computer program means for causing the print job to be stored;
computer program means for sending at least one e-mail message to the e-mail address, the e-mail message including an inquiry as to whether the job receiver identified by the e-mail message is prepared to accept a portion of the print job;

computer program means for receiving a notification of acceptance of the portion of the print job from the job receiver;

computer program means for transmitting the portion of the print job accepted by the associated job receiver to the job receiving component associated with the job receiver; and computer program means for receiving a notification when the print job is printed.

21. A method of operating a remote printing system comprising:

transmitting from a content generating party to a remote printing server, a print job comprising at least one print file generated from the content;

receiving at the remote printing server, a multitude of print jobs from at least one content generating party;

storing the print jobs;

permitting at least one remote party to express their acceptance or rejection of a portion of the print job, the acceptance signifying an agreement to have prints made using printers in accordance with the accepted portion of the print job;

receiving at the server, notification of one of: (i) an acceptance of the portion of the print job from at least one remote party who is to act on the content and (ii) rejection of the print job from the at least one party;

receiving at a job receiving component associated with the remote party, any of the portion of the print job accepted by the associated remote party;

transmitting the accepted portion to a printer for printing; and notifying the remote printing server when the print job is printed.

22. The method of operating the remote printing system according to claim 21 wherein acceptance of the portion of the print job is communicated via an email message.

23. The method of operating the remote printing system according to claim 21, wherein acceptance of the portion of the print job is communicated via on-line access to the server.

* * * * *